(12) United States Patent
Plocher et al.

(10) Patent No.: US 7,545,263 B2
(45) Date of Patent: Jun. 9, 2009

(54) AUDIO-BASED PRESENTATION SYSTEM

(75) Inventors: Thomas A. Plocher, Hugo, MN (US);
Jeffrey M. Rye, Roseville, MN (US);
Steve D. Huseth, Plymouth, MN (US);
Walter Heimerdinger, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 310 days.

(21) Appl. No.: 11/463,292

(22) Filed: Aug. 8, 2006

(65) Prior Publication Data

US 2008/0040669 A1 Feb. 14, 2008

(51) Int. Cl.
*G08B 29/00* (2006.01)
*G08B 1/08* (2006.01)
(52) U.S. Cl. ............. 340/506; 340/539.14; 340/539.18; 340/692; 340/691.6
(58) Field of Classification Search ................. 340/506, 340/539.14, 539.18
See application file for complete search history.

(56) References Cited

U.S. PATENT DOCUMENTS 5,977,872 A * 11/1999 Guertin ...................... 340/515

6,658,091 B1 * 12/2003 Naidoo et al. ................. 379/37
6,917,288 B2   7/2005 Kimmel et al.
7,203,497 B2 * 4/2007 Belcea ........................ 455/446

OTHER PUBLICATIONS

"ONYX FirstVision Interactive Firefighters' Display," Notifier by Honeywell, 2 pages, Jul. 25, 2005.

* cited by examiner

*Primary Examiner*—Donnie L Crosland
(74) *Attorney, Agent, or Firm*—Kris T. Fredrick

(57) ABSTRACT

A system for providing audio-based information pertaining to a situation communicated to a first responder en route to the situation. The information may include real-time and current data of the on-going situation (e.g., a building fire). The information may be relayed to the first responder by a dispatch center, or other intermediary, or come directly from monitoring instrumentation at a location of the situation. Also, background and/or preplanned information about the location may be provided to the first responder via a handset or other device. The responder may request certain information via the handset or device in a vehicle en route with voice requests or button activation. Visual displays of information on the instrumentation may be converted to audio- or speech-based displays for the responder.

16 Claims, 5 Drawing Sheets

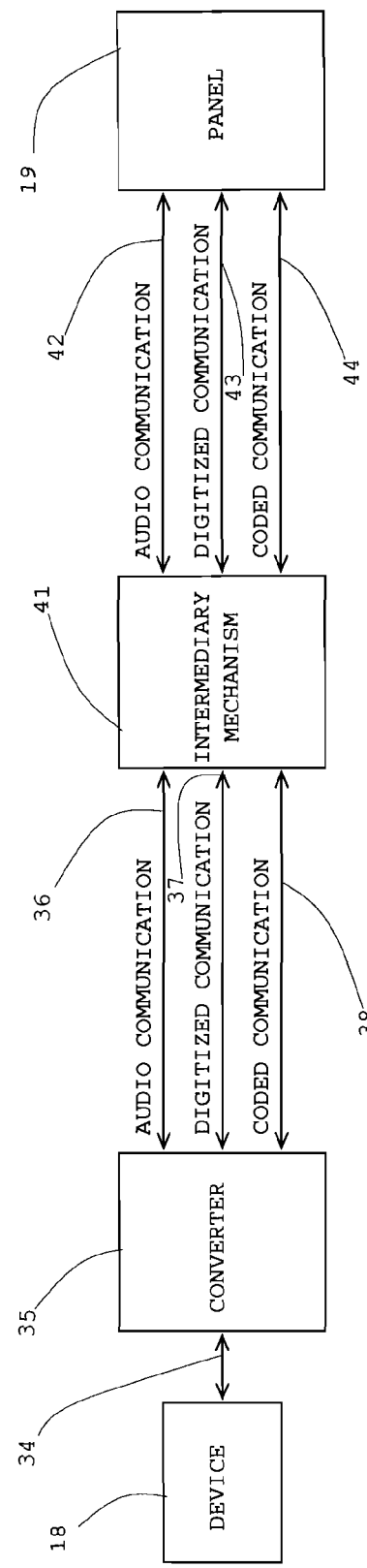
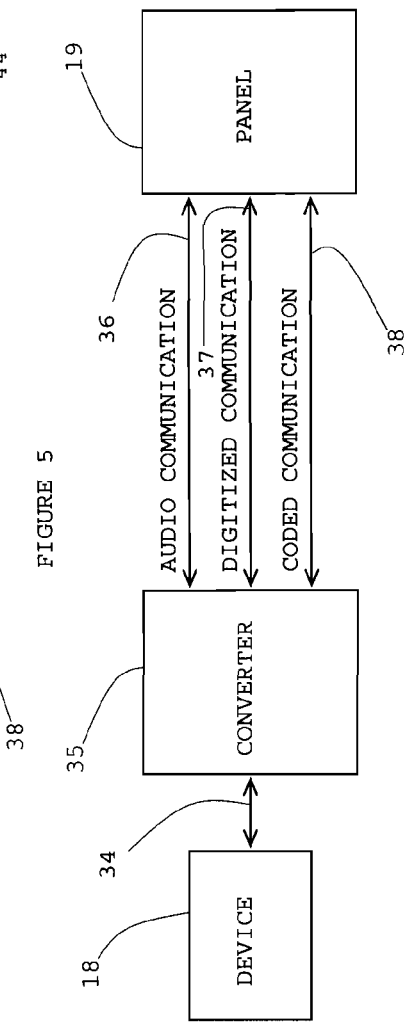
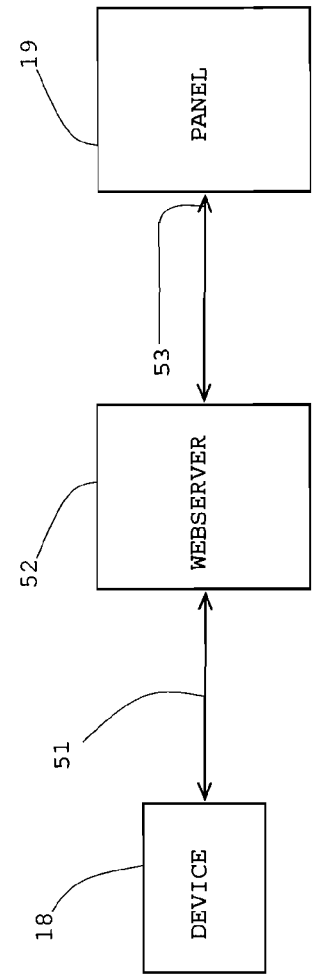
FIGURE 5
FIGURE 6
FIGURE 7

AUDIO-BASED PRESENTATION SYSTEM

BACKGROUND

The present invention pertains to situations requiring immediate attention, and more particularly to first responses. More particularly, the invention pertains to effectively providing useful information for first responses to the situations.

SUMMARY

The present invention is a speech-based or audio presentation of a situation communicated to a first responder en route to the situation.

BRIEF DESCRIPTION OF THE DRAWING

FIG. 5 shows communication modes between the first responder communication device and the facility fire panel with an intermediary mechanism;

FIG. 6 shows the communication modes of FIG. 5 without the intermediary mechanism; and FIG. 7 shows a relationship of a first responder, a webserver and a facility fire panel.

DESCRIPTION

Figure 1:
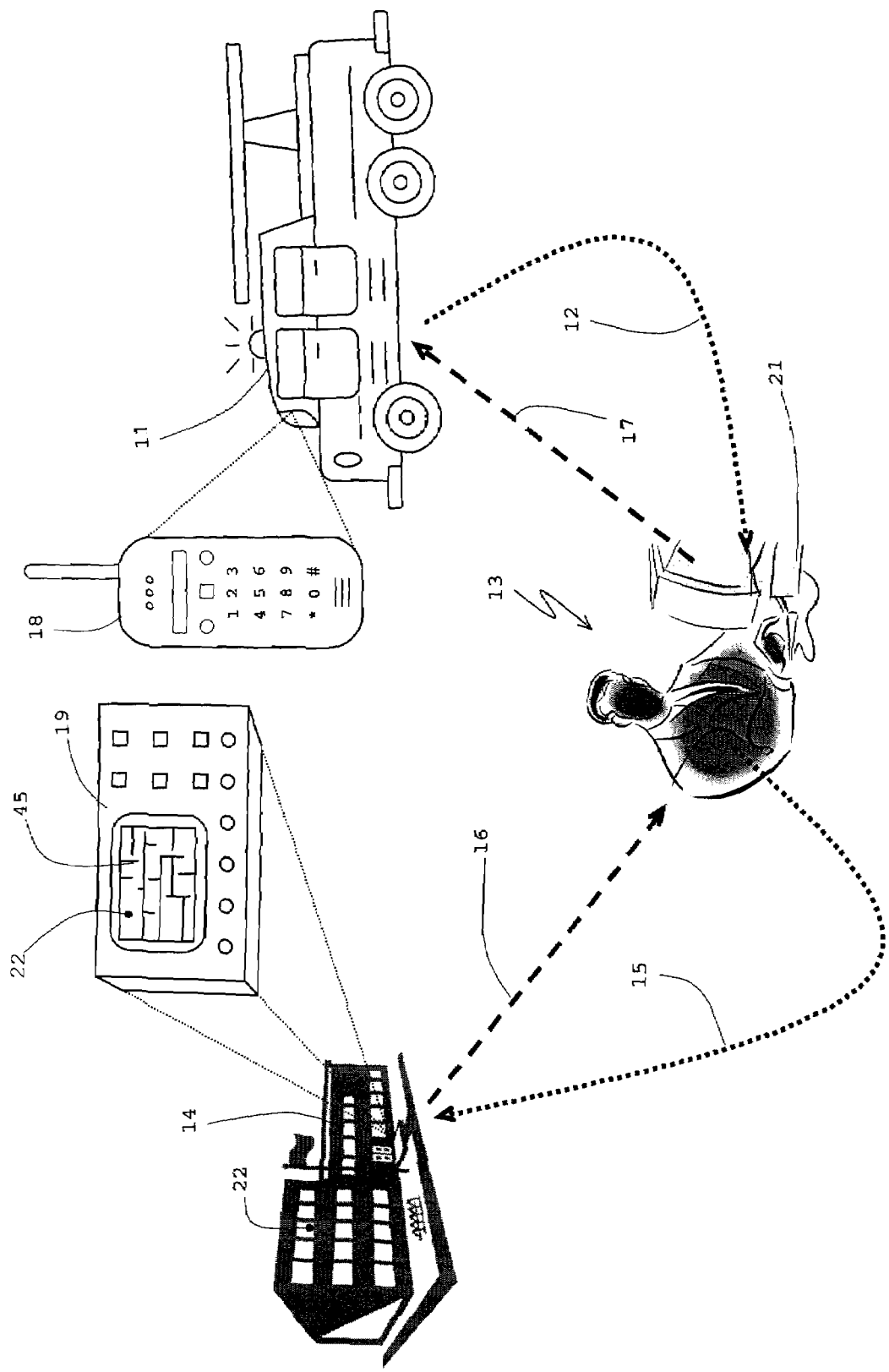
FIG. 1 shows a relationship of a first responder, dispatch center and a facility of concern.

The present invention is a speech- or audio-based presentation or display of a situation at a location, such one having a facility, communicated to a first responder en route to the location. The presentation is for providing real-time up-to-date information to the first responder while driving or riding to the facility. The presentation may be a communication via available telephone, internet and/or wireless modes from a dispatch center. The communication may be from another intermediary mechanism or directly from the facility. The speech-based or audio presentation may be accommodated by a visual display. The latter is not necessarily required with the audio presentation. There may be other information, including background, floor plans, topology, and so forth, about the facility which may help the first responder to more able to manage the situation upon arrival at the facility. Information may include observations of persons on location or proximate to the situation. Voice commands or button-actuated codes may be used by the first responder to request certain information.

A challenge may be noted in the following. Information needed by, for example, a fire commander to support an initial assessment of a fire situation upon arriving at the scene of a fire may be well-supported by a visual situation display or panel located in a lockbox or in the building lobby. A display of the situation may be available on a laptop which can be carried in an emergency vehicle by the driver or other person riding on the passenger side of the vehicle. Information about an incident and/or a respective facility may be valuable to the responder command en route to the fire. This might include preplanned and/or background information on the building structure, use, and occupancy, approaches to the building sufficient for firefighting apparatus, and entrances to the building, among other items. It might also include real-time information on the location of the first detector activation and subsequent activations, as well as sprinkler activations.

But implementation of an en route display for such information may be a challenge. A heads-down visual display may be a dangerous source of distraction for drivers. It may also be a distraction to a "right seat" passenger, in the fire truck, as being responsible for aiding the driver in route finding, avoiding collisions and controlling traffic lights. Making control inputs to switch or vary information on such an in-vehicle device may be even more difficult. Operating touchscreens, in particular, may pose a challenge to the user riding in a large vehicle that is prone to sudden speed changes, maneuvers, and bumps.

To circumvent various challenges, and to realize the potential of an enroute firefighter display, an alternative to visual displays may be desired and/or needed. The alternative approach should be simple and low cost to the fire service, using existing equipment as much as possible. A FirstVision™ (Honeywell International Inc.) may be an example of a foundational system for a panel (such as a panel 19 in FIGS. 1-4) which may include an information source for a building, facility, or location of an incident, needing a response team for emergency purposes, such as a fire or accident. This panel may provide information about, for example, the fire via detectors and about the building itself, such as floor plans, location of alarms, structure, wiring, plumbing, architecture, and so on. A challenge is that the output of the panel is very much visual, where such visual information appearing to be indispensable but is not with the present audio presentation or description of the contents of the visual display which amounts to an audio display equivalent to the visual display. The present system may incorporate a conversion of the visual information, including that displayed in panel 19, into audible information (e.g., a speech-based display) useful for an emergency first response team. The first responder may provide interim advice, indicate requirements for clearance of the first responder vehicle, call for help for the situation at the location or scene as needed or recommended (e.g., for injuries), and so on.

An audible digital speech-based display may be placed in the first responder vehicle 11 with a mechanism having voice commands or simple manual controls, e.g., handset 18 buttons, using existing communications media 12 and 17 (FIG. 1). In one approach, an emergency vehicle or first responder 11 may have a driver 25 or rider 26 (FIG. 2) who can select information that she or he wishes to hear by pressing one of the DTMF (dual-tone multi frequency) buttons on the handset or device 18. Device 18 may be a personal digital assistant (PDA), a cell phone, a BlackBerry™, radio telephone, a laptop with a phone connection, and/or the like, having audio capabilities. A DTMF signal 12 may be sent by radio or phone 18 via a link 12 to a dispatch center 13 which relays the request to a building 14 fire panel 19 by POTS (plain old telephone service) 15. A digital speech message and/or description may be generated by the panel 19 via the present system and sent back to the driver 25 or rider 26 on a POTS line 16 (e.g. a telephone line or cell phone) and/or wireless signals 17 (e.g., RF) via the dispatch center 13, such as one at a fire station or a 911 facility, or the like. The conversion of visual information (e.g., floor plan 45, detector 22, alarm on 4$^{th}$ floor, or other items) to audio information may be done by a device in the panel 19, at a dispatch center 13, in the device 18, or with a converter 35 at some intermediary place or mechanism 29 or 41.

In another approach, the user 25 or 26 in the first responder vehicle 11 may orally request information via a speech recognizer which activates the appropriate DTMF tone, eliminating the task of button pressing, from the mobile radio or phone 18. These approaches may be used to obtain preplanned information about the building 14 and real-time and current information about the location of smoke or fire 27 via active detectors 22, e.g., smoke detectors. Preplanned information may be retrieved as digital speech from a database 21, for example, at the dispatcher center 13 or from the building alarm panel 19. Real-time detector 22 information may be sent as digital speech via POTS 15 from the fire panel 19 of the building 14 to the dispatch center 13 from where it is relayed as wireless signals 17 to the first responder radio or phone 18.

Figure 2:
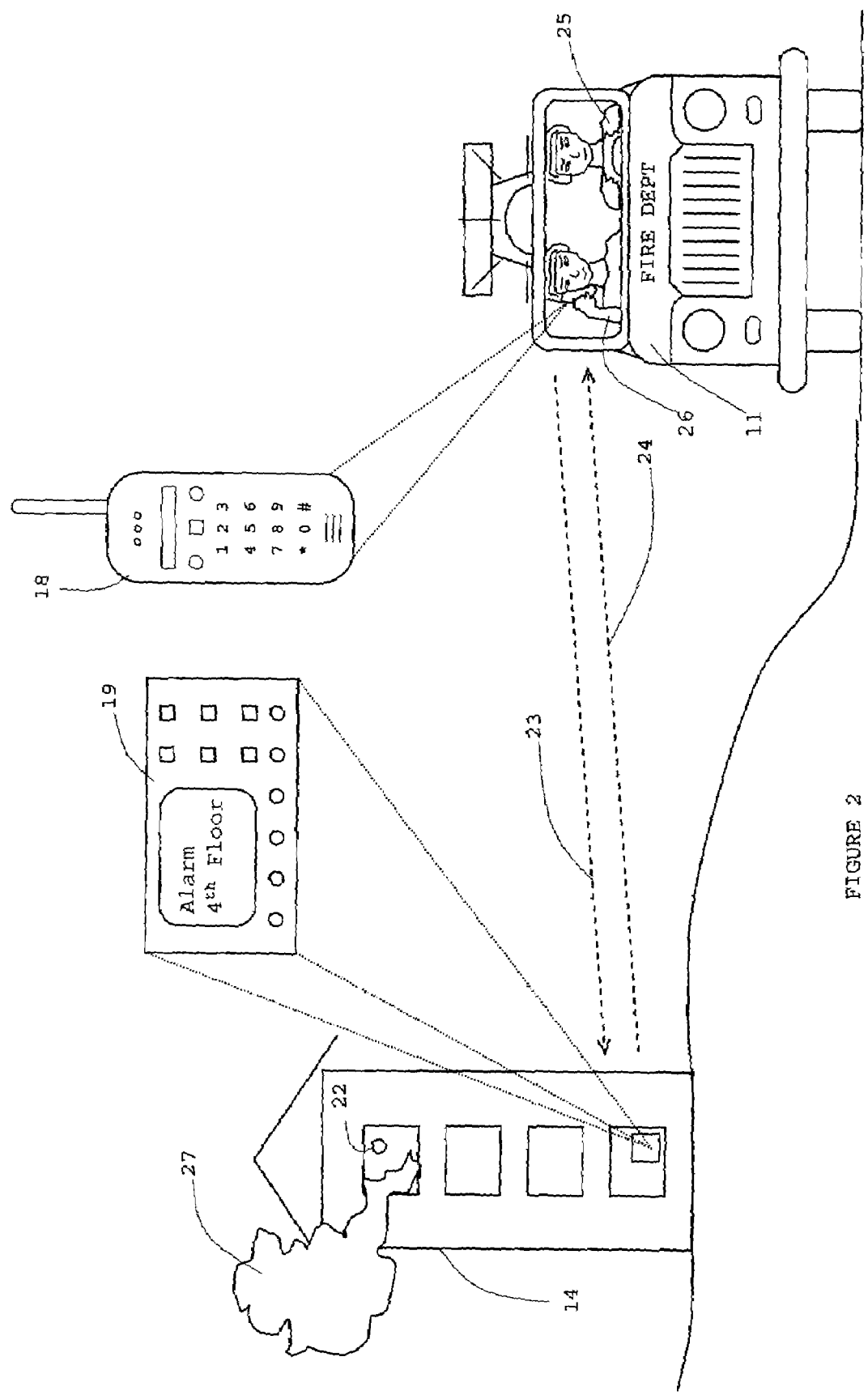
FIG. 2 shows a relationship of the first responder and the facility of concern.

A communication approach by the occupants 25 and 26 of responder vehicle 11 may make use of the various components (shown in FIGS. 1-6). They may rely on existing first responder communication capabilities such as POTs, phones, internet, dispatch centers, radios (such as a standard 800 MHz radio by Motorola, Inc.), and the like. There may be a building 14 fire panel 19 that may have a store of both preplanned information (e.g., floor plans, structure, wiring, plumbing, architecture, and so on) about the building 14, real time updates on detector 22 activations, e.g., smoke detectors, and other pertinent information. Preplanned information may be obtained from a repository at a location other than the panel 19 or dispatch center 13. Panel 19 may receive requests for specific bits of this information via coded DTMF tones over POTS 15 via center 13 and a wireless medium 12 (FIG. 1) or directly over a wireless medium 23 (FIG. 2). The user 25 or 26 may have the requested information generated in a digital speech format, and may communicate that digitized speech message to the dispatch center 13 over the wireless medium 12, or directly to panel 19 over medium 23.

Personnel of the first responder 11 may utilize the dispatch center 13, which has the capability to receive digital speech messages over POTS 16 from the fire panel 19 and relay the messages to the first responder vehicle 11 en route to the building 14 using the first responder radio system 18 via medium 17. The dispatch center 13 may also be utilized to receive requests for information coded as DTMF tones from the first responder radio 18 and to relay them over POTS 15 to panel 19 of the building 14. Alternatively, requests for information coded as DTMF tones from the first responder radio 18 may be sent directly to panel 19 via a wireless connection 23.

An alternate approach may be for the first responder to log into a webserver which both contains the building 14 information and also receives the real time detector 22 updates from the fire panel 19. It would work just like any website. The first responder would need to know the URL, login for the building website, and obtain information form the panel.

Another approach may involve the first responder 11 and the in-vehicle radio 18. The first responder may issue a request for a category of information in one of several ways. One may be done by pressing a coded DTMF button on the radio handset 18. Another may be by uttering a voice command for the information. The voice command may be processed by a speech recognizer in device 18, or another device in the cab of vehicle 11, and converted into the appropriate coded DTMF tone. In either case, the radio 18 may send the selected tone via a wireless medium 12 to the dispatch center 13. The first responder 11 may also have the capability to receive and play the digitized speech message relayed from the panel 19 to the responder 11, or via the dispatch center 13.

One may note variants of this approach, particularly for the preplanned information about the building or facilities 14 as opposed to the real-time detector 22 information. If the first responder radio 18 in the vehicle 11 has the capability to store digitized speech information itself or on an external data device, then all the required preplanned information may be uploaded to the radio 18 as digitized speech in one communication at the time of dispatch. If the radio 18 does not have storage capability, then the preplanned information may be accessed one item at a time, just as the real time updates are handled.

The present invention may extend the remote monitoring approach in terms of a speech-based approach, rather than a visual user interface, with the use of standard first responder radios 18 for the wireless communication 12 and 17, and the display of both real time fire panel 19 information and useful fire department pre-plan information, such as a floor plan 45, about the building 14 of interest or appropriate for the situation at hand.

FIG. 2 illustrates an example of a first responder vehicle 11 remote communication. As shown in this Figure, real time updates on building alarms in digital speech form may be generated at the building fire panel 19. Preplanned information such as occupancy, hazardous material locations, and so forth, may be generated in several ways. One may obtain this information from the FirstVision™ panel 19 (noted herein) in the building 14. In addition, or alternatively, the information may be obtained from the dispatch center 13 at the time of an alarm of an emergency, such as, for example, a fire in building 14. Such emergency may involve, besides property damage, injuries of people inside or outside of the building. This information may be uploaded as a single data set to the in-vehicle radio 18 over the communication paths shown herein. The information may be stored on an external data device 21 at the dispatch center 13, and accessed in the same manner as the building alarm updates, e.g., by DTMF-generated responses or by voice recognizer-generated responses. In the absence of a storage device on the in-vehicle radio 18, each single item of preplan information, and real-time information relevant to the emergency situation, may be communicated over the path 17 from the center 13 or path 24 from the panel 19 (FIGS. 1 and 2, respectively), as requested by the vehicle 11 crew via the DTMF controls or recognized voice.

There may be a wireless patch-through to emergency vehicle 11, a standard POTS connection 24, a computer speech-generated building 14 status from an alarm system panel 19, and a DTMF-generated response from first responder 11 radio or handset 18. Or there may be a voice recognizer-generated response communicated via the handset 18.

There may be an en route display approach and a web server based alternate communication approach. The firefighter 25 or 26 in the cab of the fire truck 11 may use a web-enabled cell phone 18 to access building 14 information updates in real time from the building web server. The information may be presented as digital speech on the cell phone or by a USB connection from the cell phone to a laptop. The information could be displayed on a laptop as well.

In a web-based communication approach, the information may be passed from the building fire panel or a FirstVision™ panel 19 to a secure webserver 52 (FIG. 7). The digitized speech may be generated either at the panel or at the webserver computer. Also, the webserver may have all the static building information pre-stored as digitized speech. Then just the dynamic information, such as detector activations, would have to be generated in real time. The first responder's interaction with the web-based system from there may be just like any web interaction.

Building information updates may pass from the fire panel 19 to a webserver 52 located in the building 14. The webserver may recognize the firefighter's attempt to access the web site and allow access to the information.

Figure 3:
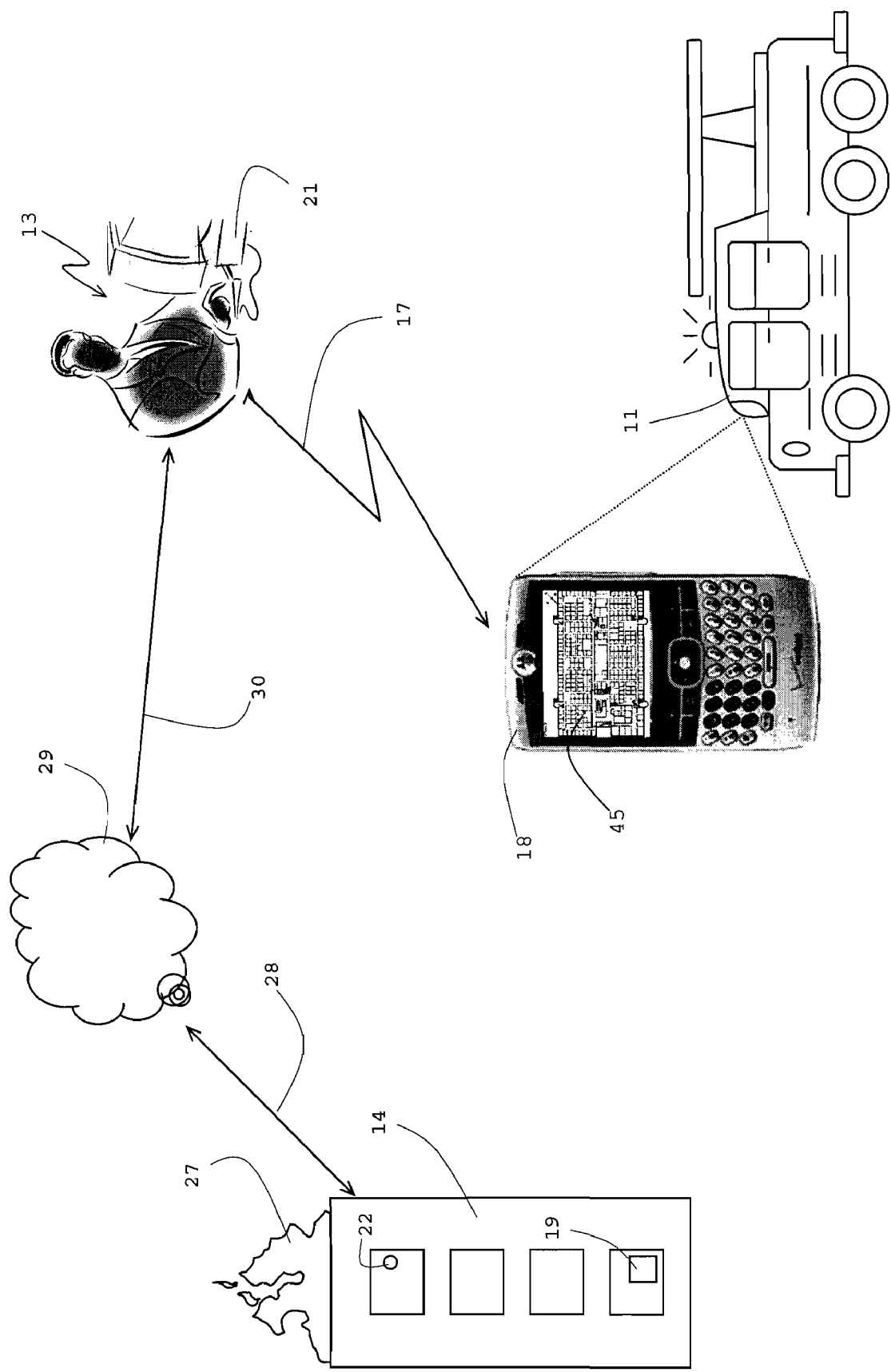
FIG. 3 shows the relationship of FIG. 1 with an intermediary mechanism between the facility and the dispatch center.

FIG. 3 shows a request, command, or communication that may go from a radio handset 18 in vehicle 11 to a dispatch center 13 via a medium 17. The dispatch center may relay the communication via a conveyance 30 to an internet 29. A satellite may be used in lieu of the internet. Other intermediary mechanisms may be used. The communication may be passed on by the internet 29 to the panel 19 in building 14 via a conveyance 28. Panel 19 may provide information in a response via conveyance 28 through the internet 29 (or other intermediary mechanism) and through conveyance 30 to the dispatch center 13. Dispatch center 13 may forward the response to the handset 18 in vehicle 18. Conveyance 28 and/or conveyance 30 may incorporate mobile broadband technology.

Figure 4:
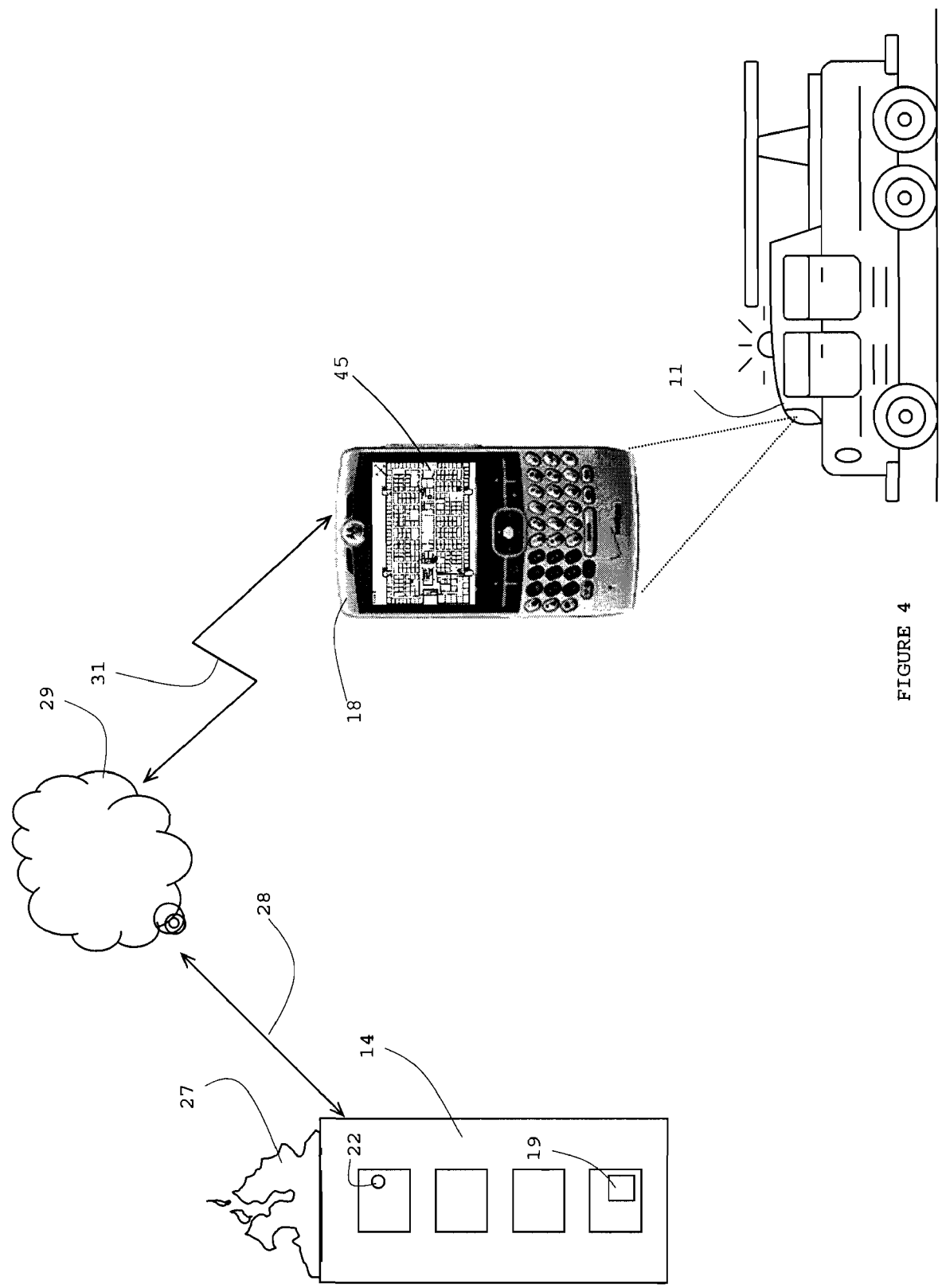
FIG. 4 shows the relationship of FIG. 3 without the dispatch center.

FIG. 4 may be similar to FIG. 3 except the dispatch center 13 is left out. A communication may be sent from the handset 18 via a conveyance 31 to an internet 29. A satellite may be used in lieu of the internet. Other intermediary mechanisms may be used. The communication may be passed on via a conveyance 28 to the panel 19 in building 14. Panel 19 may provide information in a response via the conveyance 28 through the internet 29 (or other intermediary mechanism) to the conveyance 31 which in turn may provide the communication to the handset 18. The conveyance 28 and/or 30 may incorporate mobile broadband technology.

FIG. 5 shows various approaches for communication between the handset 18 in the first response vehicle 11 and the panel 19 in building 14. A voice communication or a button on the handset may provide a signal 34 to a converter 35. The button may result in a DTMF code for a certain communication. Converter 35 may pass the voice communication on as an audio communication 36, or the voice or speech may be digitized by the converter into a digitized communication 37, or converted into a DTMF code. The DTMF code from handset 18, perhaps due to pushing a button on the handset, may be passed on through converter 35, or be another kind of signal to converter 35 being converted there to a coded communication 38. Communication signals 36, 37 and 38 may go to an intermediary mechanism 41. Mechanism 41 may be a part of and/or in addition to the dispatch center 13, an internet, a satellite, or the like. Signal conversion may be performed by mechanism 41 as desired. There may also be cross-conversion from one kind of signal to another kind at mechanism 41. The output of mechanism 41 may be an audio communication 42, a digitized communication 43 and/or a coded communication 44. Mechanism 41 may provide one or more of such signals to panel 19 in building 14. A response returned by panel 19 may be an audio communication 42, a digitized speech communication 43, and/or a DTMF or other coded communication 44. This response may proceed on to the intermediary mechanism 41. The mechanism 41 may pass the respective signals 42, 43 and/or 44, as they are, or with conversion or conditioning as desired, as an audio communication 36, a digitized (speech) communication 37, and coded communication 38 to converter 35. Converter 35 may convert the respective response communication 36, 37 and/or 38 into an understandable response 34 that one, such as driver 25 or other person 26 of the first response team in vehicle 11, may understand.

FIG. 6 shows a similar arrangement except that there is no intermediary mechanism. A speech or code request may be passed on as a signal, code, or communication 34 to converter 35. A conversion may be performed as needed of a communication 34 into an audio communication 36, a digitized communication 37 and/or a coded communication 38, which may go directly to panel 19 of a building 14. A response to the communication of a request may be sent by panel 19 as an audio communication 36, digitized communication 37 and/or a coded communication 38 to converter 35. Converter 35 may convert the respective response communication 36, 37 and/or 38 into an understandable response 34 that one, such as firefighter or personnel, in the first response vehicle 11 may understand.

FIG. 7 shows a relationship of a first responder's device 18, a webserver 52 and a facility's fire panel 19. The panel 19 may feed information to the webserver 52 via a connection 51. The first responder with the device 18 or the like may communicate with the webserver 25 via a connection 53. Connections 52 and 53 may be of a variety of media. Also, there may be other components situated between the panel 19 and device 18. Communications between the device 18 and panel 19 may proceed in either direction via the webserver 52.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A first responder presentation system comprising:
    an audio device;
    a converter connected to the audio device;
    an information panel having a visual display connected to the converter; and
    wherein:
    the visual display of the information panel is for providing visual information relating to a situation requiring attention by a first responder to which the first responder in en route; and
    the converter is for conversion of the visual information into a speech-based display of the visual information;
    the first responder can access the speech-based display with the audio device.

2. The system of claim 1, further comprising an intermediary mechanism connected to and between the audio device and the information panel for relaying transmissions between the audio device and the information panel.

3. The system of claim 2, wherein the intermediary mechanism is a dispatch center.

4. The system of claim 2, wherein the intermediary mechanism is a webserver.

5. A method for presenting information to a first responder en route, comprising:
    attaining visual information relevant to a situation requiring a response;
    converting the visual information into audio information having a speech-based format; and
    transmitting the audio information having a speech-based format to a first responder en route to the situation.

6. The method of claim 5, further comprising attaining the visual information from instrumentation at a location proximate to the situation and from other sources.

7. The method of claim 5, wherein the visual information comprises:
    sensor data;
    background;
    topology;
    floorplans;

building entrances;
building occupancy;
real-time information about detector and sprinkler activations;
location of smoke or fire via detectors;
property damage;
injuries;
preplanned data;
location data; and/or
observations of person(s) proximate to the situation.

8. The method of claim 5, further comprising responding to voice or code requests by the first responder for certain information and/or action.

9. The method of claim 5, wherein:
the visual information includes visual displays of information at the instrumentation; and
the visual displays of information are converted to audio-based displays of information for the first responder.

10. The method of claim 5, wherein the transmitting the audio information having a speech-based format is via internet, wire media, or wireless media, with or without intermediary mechanisms.

11. A system for providing an audio display to a first responder en route, comprising:
a visual information instrument proximate to a first location;
a converter connected to the visual information instrument; and
an audio communication device for a first responder connected to the converter; and
wherein:
the first location requires a presence of the first responder; and
the converter is a visual-to-audio information converter.

12. The system of claim 11, wherein the converter is for converting a visual display to a speech-based display.

13. The system of claim 11, wherein:
the audio communication device converts voice requests into electronic codes corresponding to the requests; and
the codes are transmitted to an appropriate place for responses to the voice requests.

14. The system of claim 11, wherein:
the audio communication device comprises a plurality of buttons; and
an activation of at least one button sends out a coded request corresponding to a request associated with the button.

15. The system of claim 12, wherein the speech-based display is digitized.

16. The system of claim 14, wherein the coded request is a dual-tone multi frequency signal.

* * * * *